United States Patent
Chen et al.

(10) Patent No.: US 7,346,761 B2
(45) Date of Patent: Mar. 18, 2008

(54) ALU WITH AUXILIARY UNITS FOR PRE AND POST PROCESSING OF OPERANDS AND IMMEDIATE VALUE WITHIN SAME INSTRUCTION CYCLE

(75) Inventors: Tien-Fu Chen, Min-Hsiung (TW); Chih-Heng Kang, Min-Hsiung (TW); Chen-Neng Win, Min-Hsiung (TW)

(73) Assignee: National Chung Cheng University, Chia-Yi County (TW)

( * ) Notice: Subject to any disclaimer, the term of this patent is extended or adjusted under 35 U.S.C. 154(b) by 238 days.

(21) Appl. No.: 11/246,734

(22) Filed: Oct. 8, 2005

(65) Prior Publication Data

US 2007/0083576 A1  Apr. 12, 2007

(51) Int. Cl.
*G06F 9/302* (2006.01)
(52) U.S. Cl. ........................ 712/221; 708/230; 708/524
(58) Field of Classification Search ........................ None
See application file for complete search history.

(56) References Cited

U.S. PATENT DOCUMENTS

| 5,187,795 | A  | * | 2/1993 | Balmforth et al. ............ 712/38 |
| 5,777,907 | A  | * | 7/1998 | Kwon et al. ................. 708/625 |
| 6,523,054 | B1 | * | 2/2003 | Kamijo ....................... 708/492 |
| 2005/0198472 | A1 | * | 9/2005 | Sih et al. .................... 712/218 |

* cited by examiner

*Primary Examiner*—Kenneth S. Kim

(57) ABSTRACT

An arithmetic and logic device as an integral part of a processing unit is provided to achieve code size and overhead reduction. The arithmetic and logic device contains several auxiliary computing units, each of which is capable of simple arithmetic and logical operation, under the control of a control unit. By configuring the auxiliary computing units along the data path, additional processing to the operands could be carried out within the same instruction cycle. As such, a processing unit incorporating such an arithmetic and logic device is able to achieve significant performance improvement both in terms of code size and memory access overhead.

6 Claims, 3 Drawing Sheets

ALU WITH AUXILIARY UNITS FOR PRE AND POST PROCESSING OF OPERANDS AND IMMEDIATE VALUE WITHIN SAME INSTRUCTION CYCLE

BACKGROUND OF THE INVENTION

1. Field of the Invention

The present invention generally relates to processing units, and more particularly to an arithmetic and logic device for the processing units which utilizes auxiliary computing units for performance enhancement and code size reduction.

2. The Prior Arts

Multimedia applications present a significant toll on conventional processing units. For example, the major function blocks of video compression such as motion estimation, motion compensation, discrete cosine transform, inverse discrete cosine transform, and variable length coding, etc. all require a large number of data processing instructions which in turn consume a significant portion of the processing capability of conventional processing units.

Various architectural improvements of central processing units (CPUs) have been proposed to facilitate the processing of multimedia applications. For example, recent commercial CPUs are designed to support various SIMD (single instruction multiple data) instructions such as Intel® Pentium CPU's streaming SIMD extension (SSE). Similarly, the digital signal processors (DSPs) are designed to support MAC instruction so that more data could be processed in a single instruction cycle.

One type of these architectural improvements is to use auxiliary computing units along the data path so as to reduce code size and the overhead of moving data between the CPU and the register file. For a CPU without the auxiliary computing units, the following code segment:

```
struct test_struct {
    int x;
    int y;
} t;
t.x += 7;
t.y += 5;
t.x += t.y
``` would be compiled into the following assembly codes:

```
movl    4(%esp), %edx   ; point to t
movel   (%edx), %eax    ; x itself
movel   4(%edx), %ebx   ; y itself
add     #7, (%eax)      ; t.x += 7
add     #5, (%ebx)      ; t.y += 5
add     (%ebx), (%eax)  ; t.x += t.y.
```

Obviously, at least three "add" instructions are required. However, for a CPU with appropriate auxiliary computing units, the code segment could be translated to the following assembly codes, which required only one "add" instruction:

```
movl    4(%esp), %edx   ; point to t
movel   (%edx), %eax    ; x itself
movel   4(%edx), %ebx   ; y itself
add     (%eax) ADD #7, (%ebx) ADD #5, (%eax)
                        ; t.x = (t.x + 7) + (t.y + 5).
```

For the foregoing single "add" instruction to work, there should be some auxiliary computing units to perform the preliminary ADD operations. As such, significant code size and data moving overhead reduction could be achieved, and the performance of the processing unit is greatly enhanced.

SUMMARY OF THE INVENTION

Considering the dramatic improvement provided by the auxiliary computing units, the present invention provides an arithmetic and logic device as an integral part of a processing unit so as to achieve code size and overhead reduction.

The processing unit has a register file capable of providing three source operands and a destination operand. The processing unit is also capable of providing an immediate value during the execution of an instruction. An embodiment of the present invention contains three auxiliary computing units, a control unit, and an arithmetic and logic unit. The two inputs of the arithmetic and logic unit are connected to the outputs of two front-end auxiliary computing units, respectively. The output of the arithmetic and logic unit is fed to one of the inputs to the back-end auxiliary computing unit.

Each of the auxiliary computing units has three inputs. The three auxiliary computing units all have an immediate value and the third source operand as their inputs. The three auxiliary computing units also take the first source operand, the second source operand, and the output of the arithmetic and logic unit as their inputs, respectively. Each auxiliary computing unit provides only simple operations including simple integer arithmetic operations such as ADD and SUB, bitwise logic operations such as AND, NOT, OR, XOR, and various shift operations such as SHIFT, ROTATE, etc. All auxiliary computing units are all controlled by the control unit in order to determine what to operate, which operation to perform, and what to output.

With the incorporation of the auxiliary computing units, a processing unit according to the present invention is able to execute two or more instructions under the conventional architecture in a single instruction cycle, and reduce the number of memory accesses. As such, significant performance improvement could be achieved.

The foregoing and other objects, features, aspects and advantages of the present invention will become better understood from a careful reading of a detailed description provided herein below with appropriate reference to the accompanying drawings.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1A:
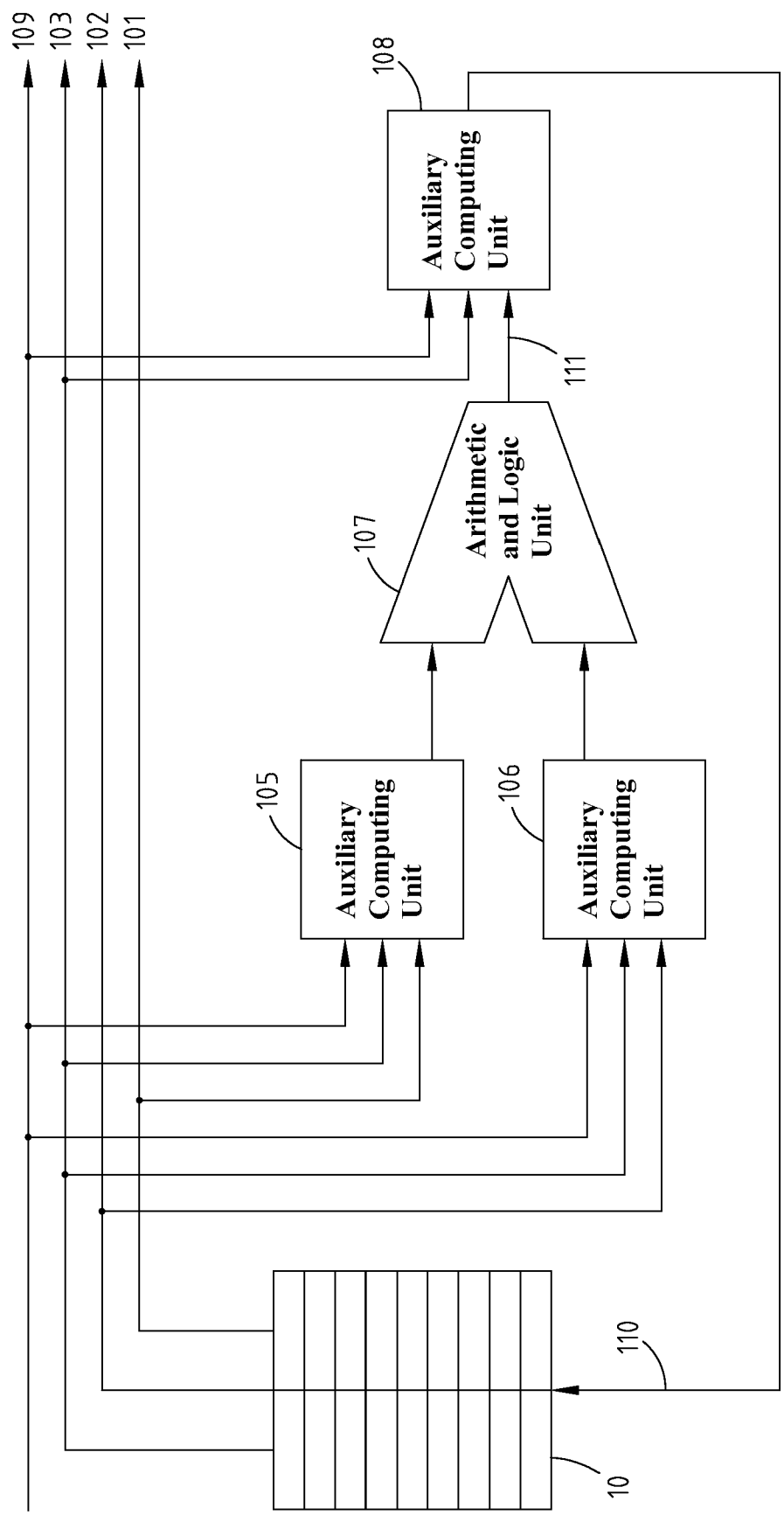
FIG. 1a is a schematic diagram showing the arithmetic and logic device according to an embodiment of the present invention.

FIG. 1a is a schematic diagram showing the arithmetic and logic device according to an embodiment of the present invention. The arithmetic and logic device 100 is an integral part of a processing unit (not shown in FIG. 1a) whose details are omitted here for simplicity, except that the processing unit has a register file 10 containing multiple registers. The register file 10 is capable of providing at least three source operands 101, 102, and 103 (hereinafter, as the first, second, and third source operands), and a destination operand 110 during the execution of an instruction. The processing unit is also capable of providing an immediate value 100 during the execution of an instruction. The source operands and the immediate value 101, 102, 103, and 109 are the inputs to the arithmetic and logic device 100 and the destination operand 110 is the output from the arithmetic and logic device 100.

As illustrated in FIG. 1a, the arithmetic and logic device 100 of the present embodiment contains three auxiliary computing units 105, 106, and 108, a control unit (shown in FIG. 2) 200, and an arithmetic and logic unit 107. The arithmetic and logic unit 107 is exactly identical to a common arithmetic and logic unit which has two inputs and an output. The two inputs of the arithmetic and logic unit 107 are connected to the outputs of the auxiliary computing units 105 and 106, respectively. The auxiliary computing units 105 and 106 are referred to as front-end auxiliary computing units hereinafter. On the other hand, the output 111 of the arithmetic and logic unit 107 is fed to one of the inputs to the auxiliary computing unit 108, which is referred to as back-end auxiliary computing unit hereinafter.

Figure 2:
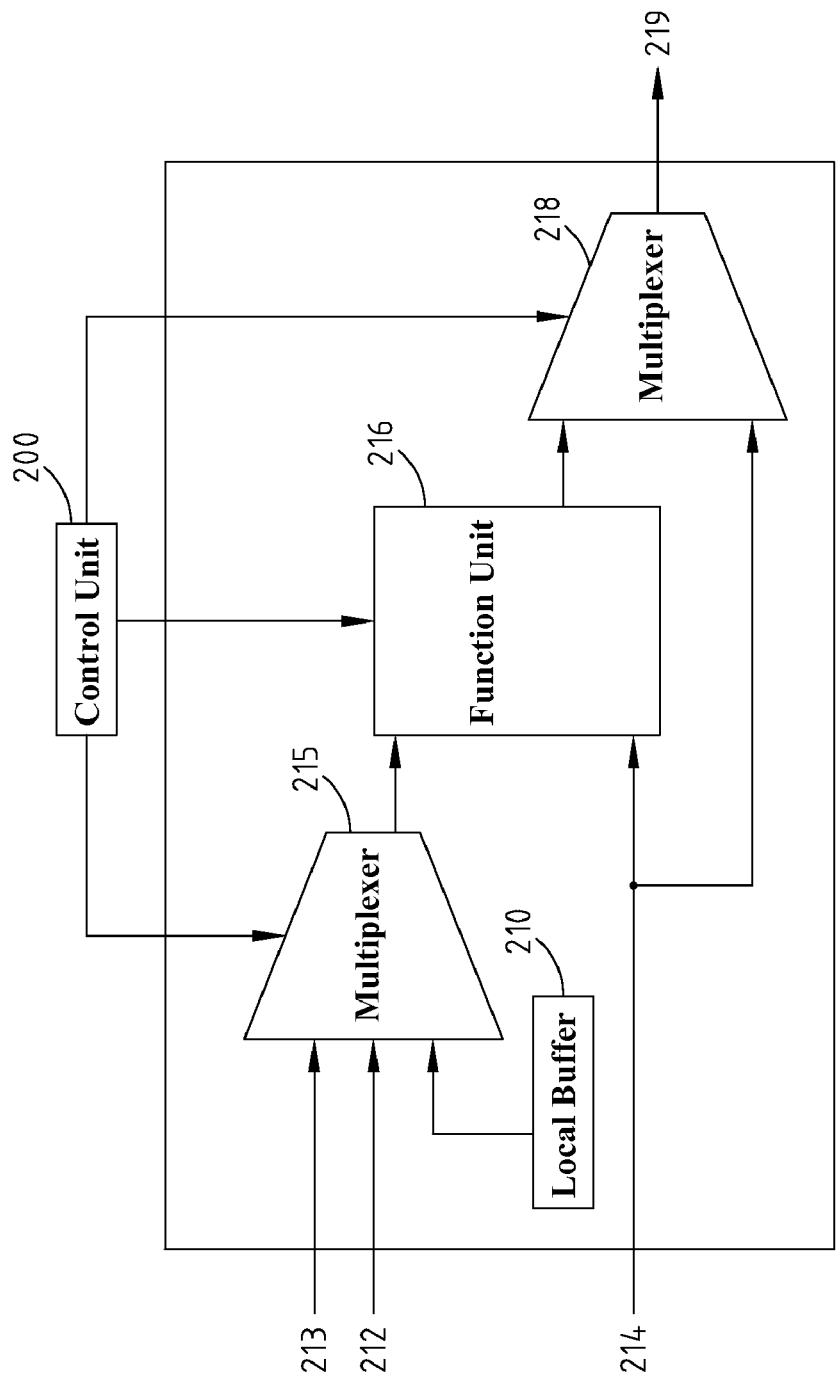
FIG. 2 is a schematic diagram showing the internal structure of the auxiliary computing unit according to an embodiment of the present invention.

The auxiliary computing units 105, 106, and 108 are identically structured as illustrated in FIG. 2. Each of the auxiliary computing units has three inputs 212, 213, and 214, and an output 219. In connection with FIG. 1a, it could be seen that the three auxiliary computing units 105, 106, and 108 always have their input 213 from an immediate value 109, and their input 212 from the third source operand 103. As to the input 214, the three auxiliary computing units 105, 106, and 108 are configured differently, as specified in the following table:

| aux. comp. unit | input | | |
|---|---|---|---|
| | 212 | 213 | 214 |
| 105 | third source operand 103 | immediate value 109 | first source operand 101 |
| 106 | third source operand 103 | immediate value 109 | second source operand 102 |
| 108 | third source operand 103 | immediate value 109 | arithmetic and logic unit output 111 |

As configured, the first and second source operands 101 and 102 could be further processed by the front-end auxiliary computing units 105 and 106 while the output 111 of the arithmetic and logic unit 107 could be further processed by the back-end auxiliary computing unit 108. As such, the effect of two or more consecutive instructions could be achieved by a single instruction. For example, the following two instructions where r1, r2, r3, are r5 are registers of the register file 10:

shift_right r2, r5
    add r1, r2, r3 could be achieved by a single instruction where ">>" is the right-shift operator:

add r1, r2>>r5, r3 as the right-shift operation of the register r2 could be carried out by the front-end auxiliary computing unit 106. In addition to having a third source operand 103 involved in the additional processing of the other two source operands 101 and 102, the present invention involving an immediate value in the additional processing could achieve similar effect. For example, the following two instructions where "#5" is an unsigned integer value:

shift_right r2, #5
    add r1, r2, r3 could be achieved by a single instruction:

add r1, r2>>#5, r3.

Please note that, as the register file provides only three source operands, therefore the three auxiliary computing units all use the same third source operands 103 as described above. Similarly, the immediate value 109 is also used by all three auxiliary computing units.

Please refer to FIG. 2 again. As illustrated, each of the three auxiliary computing units 105, 106, and 108 contains an optional local buffer 210, a function unit 216 and at least a first multiplexer 215. In order to decrease timing delay of the arithmetic and logic device according to the present invention, the function unit 216 of each auxiliary computing unit provides only simple operations including, but not limited to, simple integer arithmetic operations such as ADD and SUB, bitwise logic operations such as AND, NOT, OR, XOR, and various shift operations such as SHIFT, ROTATE, etc. The first multiplexer 215 has three inputs which are connected to the local buffer 210, the input 212 of the auxiliary computing unit (i.e., the third source operand 103), and the input 213 of the auxiliary computing unit (i.e., the immediate value 109). The first multiplexer 215 then decides which one of the three inputs is to participate in the operation provided by the function unit 216 with the input 214 of auxiliary computing unit (i.e., the first source operand 101, the second source operand 102, or the output 111 of the arithmetic and logic unit 107 ). In addition, for reducing power consumption, an additional second multiplexer 218 could be configured to determine whether the output 219 of the auxiliary computing unit is from the output of the function unit 216 or directly from the input 214 (i.e., the first source operand 101, the second source operand 102, or the output 111 of the arithmetic and logic unit 107 ).

As illustrated in FIG. 2, the multiplexers 215 and 218, and the function unit 216 of all auxiliary computing units 105, 106, and 108 are all controlled by the control unit 200 in order to determine which source of the first multiplexer 215 is selected, which operation is performed by the function unit 216, and which one is outputted from the second multiplexer 218. As such, an instruction such as the following:

add r1<<#1, r2, r3 would be carried out by the present invention as follows: (1) the right shift of the register r1 is performed by the third auxiliary computing unit 108; (2) the content of the register r2 bypasses the function unit 216 of the second auxiliary computing unit 106; (3) the content of register r3 is logically AND with the immediate value #1 by the second auxiliary computing unit 106; and (4) the content of register r2 and the content of register r3 (after the logically AND operation (3)) are then added together and stored in the register r1. Please note that, without encoding limitations, the auxiliary computing units 105, 106, and 108 could carry out their operations with different sources. However, with encoding limitations, the third source operand 103 and the immediate value 109 could be operated in the auxiliary computing units at a time only.

Since the first multiplexer 215 of each auxiliary computing unit could choose from three possible inputs, each auxiliary computing unit has three operation modes depending on the instruction to be executed. For the first mode, the immediate value 109 (from the input 213) is specified by an instruction and the first multiplexer 215 is commanded by the control unit 200 accordingly, so that the immediate value 109 participates in an operation with the input 214 and the result is then fed to the arithmetic and logic unit 107 or to the destination operand 110. For the second mode, the third source operand 103 (from the input 212) is specified by an instruction and the first multiplexer 215 is commanded by the control unit 200 accordingly, so that the third source operand 103 participates in an operation with the input 214 and the result is then fed to the arithmetic and logic unit 107 or to the destination operand 110. Similarly, for the third mode, the content of the local buffer 210 participates in an operation with the input 214 and the result is then fed to the arithmetic and logic unit 107 or to the destination operand 110. The reason for having a local buffer 210 in the auxiliary computing unit is to obviate the limited number of ports of the register file 10 and, as such, the auxiliary computing units are not confined to use the same third source operand. However, additional move instruction is required to initialize the local buffer 210 which, in the worse case when all three auxiliary computing units require different local buffer values, would result in an overhead of at most three cycles. Such overhead is insignificant as the move instruction is much faster than other data processing instructions and could be ignored considering the huge saving achieved by the present invention for multimedia applications.

Figure 1B:
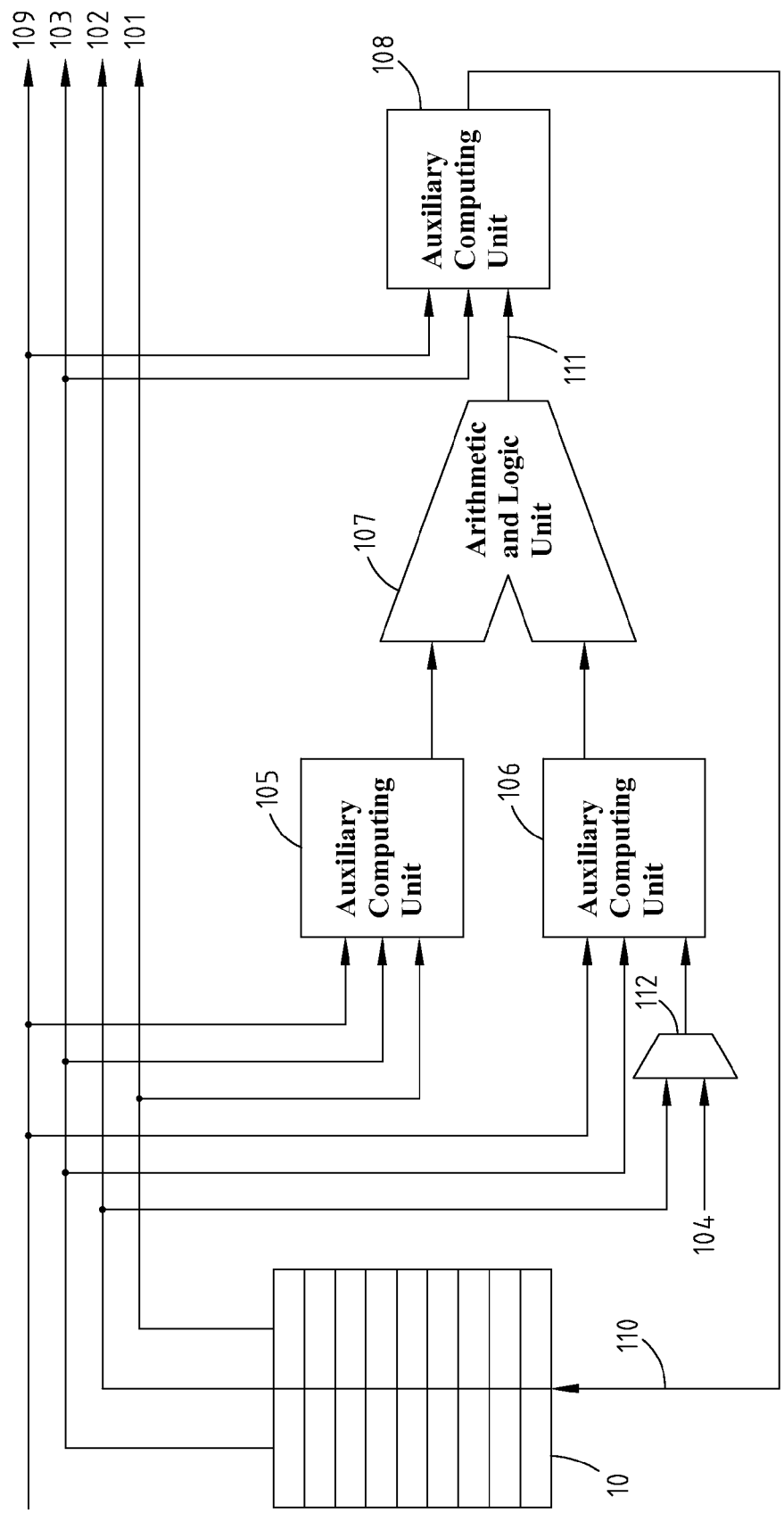
FIG. 1b is a schematic diagram showing the arithmetic and logic device according to another embodiment of the present invention.

FIG. 1b is a schematic diagram showing the arithmetic and logic device according to another embodiment of the present invention. As illustrated, the processing unit is able to provide an additional immediate value 104, and the arithmetic and logic device contains an addition multiplexer 112 in front of the front-end auxiliary computing unit 106 which is also under the control of the control unit 200. As such, the front-end auxiliary computing units (e.g., the second auxiliary computing unit 106) could further choose whether to operate on a source operand (e.g., the second source operand 102) or an immediate value 104.

Please note that, depending on the characteristics of the application, the present invention could be applied in embodiments that have less or more than three auxiliary computing units. Such flexibility allows the processor designer to strike a balance between the performance and the die area of the processing unit.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An arithmetic and logic device for use in a processing unit, said processing unit comprising a register file capable of outputting at least a first source operand, a second source operand, a third source operand, and a destination operand, said processing unit capable of generating a first immediate value, said arithmetic and logic device comprising:
    an arithmetic and logic unit having a first input, a second input, and an output;
    a first auxiliary computing unit, a second auxiliary computing unit, a third auxiliary computing unit, each of which has first, second, and third inputs and an output;
    a control unit controlling the operation of said first, second, and third auxiliary computing units;
    wherein the outputs of said first and second auxiliary computing units are connected to said first and second inputs of said arithmetic and logic unit respectively, said output of said arithmetic and logic unit is connected to said first input of said third auxiliary computing unit;
    said first immediate value and said third source operand are fed to said second and third inputs of all said auxiliary computing units; and said first source operand is fed to said first input of said first auxiliary computing unit, said second source operand is fed to said first input of said second auxiliary computing unit, and said output of said third auxiliary computing unit is fed to said destination operand.

2. The arithmetic and logic device according to claim 1, wherein said processing unit is capable of generating a second immediate value; said arithmetic and logic device further comprises a multiplexer; said multiplexer has its output connected to said first input of said second auxiliary computing unit, and an original source of said first input of said second auxiliary computing unit and said second immediate value are connected to said multiplexer as inputs;
    and said multiplexer is controlled by said control unit so that said multiplexer determines to send either the original source of said first input of said second auxiliary computing unit or said second immediate value to said second auxiliary computing unit.

3. The arithmetic and logic device according to claim 1, wherein each of said auxiliary computing units comprises:
    a function unit under the control of said control unit performing one of a plurality of operations, said function unit having first and second inputs, and an output; said output of said function unit being connected to said output of the respective auxiliary computing unit; and
    a first multiplexer having an output connected to said first input of said function unit and having at least two inputs connected to said second and third inputs of the respective auxiliary computing unit, said first multiplexer being controlled by said control unit to determine which inputs is fed to said function unit.

4. The arithmetic and logic device according to claim 3, wherein each of said auxiliary computing units further comprises a local buffer whose content is fed to said first multiplexer.

5. The arithmetic and logic device according to claim 3, wherein each of said auxiliary computing units farther comprises a second multiplexer which has one input con nected to said output of said function unit and the other input connected to said first input of the respective auxiliary computing unit; said second multiplexer is controlled by said control unit to determine to send either said output of said function unit or said first input of the respective auxiliary computing unit as output.

6. The arithmetic and logic device according to claim 3, wherein said plurality of operations comprise simple integer arithmetic operations, bitwise logic operations, and shift operations.

* * * * *